(12) United States Patent
Pan et al.

(10) Patent No.: US 11,935,214 B2
(45) Date of Patent: Mar. 19, 2024

(54) VIDEO CONTENT REMOVAL USING FLOW-GUIDED ADAPTIVE LEARNING

(71) Applicant: Baidu USA, LLC, Sunnyvale, CA (US)

(72) Inventors: Zhihong Pan, San Jose, CA (US); Daming Lu, Dublin, CA (US); Xi Chen, San Jose, CA (US)

(73) Assignee: Baidu USA LLC, Sunnyvale, CA (US)

(*) Notice: Subject to any disclaimer, the term of this patent is extended or adjusted under 35 U.S.C. 154(b) by 0 days.

(21) Appl. No.: 17/160,289

(22) Filed: Jan. 27, 2021

(65) Prior Publication Data
US 2022/0237750 A1    Jul. 28, 2022

(51) Int. Cl.
| | |
|---|---|
| G06T 5/00 | (2006.01) |
| G06F 18/2113 | (2023.01) |
| G06T 7/11 | (2017.01) |
| G06T 7/194 | (2017.01) |
| G06T 7/269 | (2017.01) |
| G06T 7/70 | (2017.01) |
| G06V 10/75 | (2022.01) |
| G06V 20/40 | (2022.01) |
| G11B 27/036 | (2006.01) |
| G06V 30/10 | (2022.01) |

(52) U.S. Cl.
CPC .......... *G06T 5/005* (2013.01); *G06F 18/2113* (2023.01); *G06T 7/194* (2017.01); *G06T 7/269* (2017.01); *G06T 7/70* (2017.01); *G06V 10/751* (2022.01); *G06V 20/49* (2022.01); *G11B 27/036* (2013.01); *G06T 2207/10016* (2013.01); *G06T 2207/20081* (2013.01); *G06V 30/10* (2022.01)

(58) Field of Classification Search
USPC .................................................. 386/278–290
See application file for complete search history.

(56) References Cited

U.S. PATENT DOCUMENTS

| | | | |
|---|---|---|---|
| 10,007,863 B1 | 6/2018 | Pereira et al. | |
| 10,540,757 B1 * | 1/2020 | Bouhnik | ........... G06T 7/37 |

(Continued)

FOREIGN PATENT DOCUMENTS

| | | | | |
|---|---|---|---|---|
| EP | 3737083 A1 * | 11/2020 | ........... | G06N 20/00 |
| WO | WO-2022005448 A1 * | 1/2022 | | |

OTHER PUBLICATIONS

Zhang et al., "An Internal Learning Approach to Video Inpainting," 2019 IEEE/CVF International Conference on Computer Vision (ICCV), pp. 2720-2729. (Year: 2019).*

(Continued)

*Primary Examiner* — Hung Q Dang
(74) *Attorney, Agent, or Firm* — NORTH WEBER & BAUGH LLP

(57) ABSTRACT

Presented herein are systems and methods for an end-to-end solution for object removal from a video using adaptive learning. In one or more embodiments, using a pre-trained image inpainting model, in-scene training data may be generated using optical-flow guided sampling. In one or more embodiments, the sampled patches are used to generate a training dataset, which is used to further train the image inpainting model until reaching a stop condition. The adaptively trained inpainting model may be used to generate a modified video in which the desired object or objects have been removed and the corresponding removed portion(s) have been filled (or inpainted) to preserve the integrity of the image.

20 Claims, 9 Drawing Sheets

(56) References Cited

U.S. PATENT DOCUMENTS

| | | | | |
|---|---|---|---|---|
| 10,671,838 | B1* | 6/2020 | Bogan, III | G06T 11/001 |
| 11,024,060 | B1* | 6/2021 | Ma | G06T 11/40 |
| 2016/0203388 | A1 | 7/2016 | Li et al. | |
| 2019/0295227 | A1* | 9/2019 | Wang | G06T 5/005 |
| 2020/0104622 | A1* | 4/2020 | Iwamoto | G06V 20/52 |
| 2020/0327675 | A1* | 10/2020 | Lin | G06T 7/194 |
| 2020/0357099 | A1* | 11/2020 | Long | G06V 10/764 |
| 2021/0287007 | A1* | 9/2021 | Wang | G06V 20/41 |
| 2021/0304387 | A1* | 9/2021 | Schroers | G06N 3/04 |
| 2021/0342984 | A1* | 11/2021 | Lin | G06T 5/50 |
| 2021/0374904 | A1* | 12/2021 | Liao | G06T 11/40 |

OTHER PUBLICATIONS

Cai et al., "Semantic object removal with convolutional neural network feature-based inpainting approach," Springer-Verlag GmbH Germany, part of Springer Nature 2018, Multimedia Systems (2018) 24:597-609. (Year: 2018).*

Zhu et al., "A deep learning approach to patch-based image inpainting forensics," Signal Process. Image Commun., vol. 67, pp. 90-99. (Year: 2018).*

Borole, Rajesh Pandurang and Bonde, Sanjiv Vedu. "Patch-Based Inpainting for Object Removal and Region Filling in Images" Journal of Intelligent Systems, vol. 22, No. 3, 2013, pp. 335-350. https://doi.org/10.1515/jisys-2013-0031 (Year: 2013).*

The Extended European Search Report dated Jul. 8, 2022, in European Application No. 22 15 3561.0. (19pgs).

Kim et al., "Deep Video Inpainting," In 2019 IEEE/CVF Conference on Computer Vision and Pattern Recognition (CVPR), 2019. (10pgs).

Huang et al.,"Temporally Coherent Completion of Dynamic Video," In ACM Trans. Graph., vol. 35, No. 6, Article 196, Nov. 2016. (11pgs).

Liu et al.,"Learning to See Through Obstructions with Layered Decomposition," arXiv preprint arXiv:2008.04902, 2020. (19pgs).

Mosleh et al.,"Automatic Inpainting Scheme for Video Text Detection and Removal," IEEE Transactions on Image Processing, vol. 22, No. 11 , Nov. 2013. (13pgs).

Yan et al.,"Automatic video logo detection and removal", In Multimedia Systems, Springer, vol. 10, No. 5, Aug. 2005. (13pgs).

Lu et al.,"Automatic logo transition detection in digital video contents," In Pattern Analysis & Applications, Springer-Verlag, vol. 15, No. 2, Mar. 2012. (13pgs).

Natarajan et al.,"Large-Scale, Real-Time Logo Recognition in Broadcast Videos," In 2011 IEEE, Multimedia & Expo (ICME) , 2011. (4pgs).

Lee et al.,"Story-related caption detection and localization in news video," In Optical Engineering, vol. 48(3), 2009. (13pgs).

Chan et al.,"Free-form Video Inpainting with 3D Gated Convolution and Temporal PatchGAN," In Proceedings of the IEEE International Conference on Computer Vision, 2019. (10pgs).

Ebdelli et al.,"Video inpainting with short-term windows: application to object removal and error concealment," In IEEE Transactions on Image Processing, 2015. (15pgs).

Gao et al., "Flow-edge Guided Video Completion," arXiv preprint arXiv:2009.01835, 2020. (17pgs).

Goodfellow et al., "Generative adversarial nets," In Advances in neural information processing systems, 2014. (9 pgs).

Huang et al., "Temporally coherent completion of dynamic video," In ACM Transactions on Graphics (TOG), 2016. (11pgs).

Tang et al.,"Video Inpainting on Digitized Vintage Films via Maintaining Spatiotemporal Continuity," In IEEE Transactions on Multimedia 13.4, 2011. (13 pgs).

Wang et al., "Video Inpainting by Jointly Learning Temporal Structure and Spatial Details," In Proceedings of the AAAI Conference on Artificial Intelligence, 2019. (8pgs).

Xu et al., "Deep Flow-Guided Video Inpainting," In Proceedings of the IEEE Conference on Computer Vision & Pattern Recognition, 2019. (10pgs).

Yu et al., "Free-Form Image Inpainting with Gated Convolution," In Proceedings of the IEEE International Conference on Computer Vision, 2019. (10 pgs).

Yu et al., "Generative Image Inpainting with Contextual Attention," In Proceedings of the IEEE conference on computer vision & pattern recognition, 2018. (10 pgs).

* cited by examiner

600

```
┌─────────────────────────────────────────────────────────┐
│ Given a list of detected objects for a mask, apply one  │
│ or more filters to filter the list of detected objects  │─ 605
│ to select a subset to generate object masks for further │
│ removal and refilling                                   │
└─────────────────────────────────────────────────────────┘
                              │
                              ▼
┌─────────────────────────────────────────────────────────┐
│ Output the final mask for use in object removal and     │─ 610
│ inpainting                                              │
└─────────────────────────────────────────────────────────┘
```

FIG. 6

800
805
Original Image
810
Output Image with Inpainting
FIG. 8

VIDEO CONTENT REMOVAL USING FLOW-GUIDED ADAPTIVE LEARNING

BACKGROUND

A. Technical Field

The present disclosure relates generally to systems and methods for computer learning that can provide improved computer performance, features, and uses. More particularly, the present disclosure relates to systems and methods regarding video image editing.

B. Background

Video inpainting, also known as video completion, involves attempting to fill in missing regions of a given video sequence. A goal is to fill a portion of the video with content that is both spatially and temporally coherent. It has many real-world applications such as removing undesired objects and restoring corrupted video files. Removing relatively stationary objects, like logo and text-like captions, are also some of the applications that can benefit from video inpainting.

The amount of video content that has been generated and that is available has dramatically increased over that last few years. A substantial number of videos are posted online to video posting websites or via video sharing applications. Often, the posting site, the video poster, or both will include content, such as a logo, image, web address, identifier, social media identifier, etc. Removing this content is sometimes desirable but very difficult to accomplish.

Like many other computer vision applications, deep learning-based video inpainting methods in recent years have pushed the envelope in performance. The early models used three-dimensional (3D) convolutions in an attempt to ensure spatial-temporal coherence, but their high memory demands limit their application, especially with regard to high resolution videos.

Recognizing that the background and most objects in a video sequence typically have trackable motion, many recent video inpainting methods try to take advantage of the optical flow of the sequence. Some have proposed synthesizing a coherent optical flow across the frames first so most regions can be propagated from known regions. As not all missing regions can be filled this way, others introduced non-local flow connections to temporally distant frames to further improve inpainting performances.

Flow-guided video inpainting methods may work well for removal of foreground objects when they are in motion in relation to backgrounds. However, as it propagates from known regions based on optical flow, it may relocate unwanted patches that cause undesirable visual artifacts when optical flow estimation is not reliable. For objects like logo and text, this is more of a concern as they are relatively stationary and positioned near borders or edges where motions are not as significant as the central area. For areas that cannot be restored with propagation, generative adversarial network (GAN) based image painting methods have been tried to synthesize the missing content with high spatial coherence. However, these image inpainting models are typically trained with still images and do not take either known contents of the video nor temporal coherence into consideration.

Accordingly, what is needed are better systems and methods for detecting, removing, and replacing content in videos.

SUMMARY

As noted above, improved systems and methods for detecting, removing, and replacing content in videos are needed. Presented herein are systems, methods, and computer-readable media comprising instructions for methods that perform the following methods.

In one or more embodiments, a method comprises: splitting an input video into a set of video sequences, which comprise one or more video frames; generating one or more object masks, which represent one or more areas comprising an object or objects targeted to be removed and inpainted in the video sequences; generating optical flows for each video sequence; and for each video sequence from the set of video sequences: updating a pretrained inpainting model using patch samples selected from the video sequence using at least some of the optical flows; and using the updated inpainting model to modify the video sequence to inpaint at least part of the video sequence.

In one or more embodiments, the step of updating an inpainting model using patch samples selected from the video sequence using at least some of the optical flows comprises: using optical flows related to a detected object or objects in the video sequence to define one or more sampling areas in the video sequence; sampling one or more patches in the one or more sampling areas; for each patch, generating a corresponding masked patch, which represent a masked version of the patch; and updating the inpainting model using the masked patches as inputs into the inpainting model and the patches as corresponding ground truth references.

In one or more embodiments, the step of using optical flows related to a detected object or objects in the video sequence to define one or more sampling areas in the video sequence comprises, for an object mask of the video sequence: calculating average velocity functions around the object mask using optical flows from the sequence; selecting a video frame from the sequence; and estimating the sampling area in a video frame of the video sequence using the average velocity functions.

In one or more embodiments, the step of generating one or more object masks may comprise a first method comprising, given a known template corresponding to the object to be located, applying template matching at different image scales to detect a location and scale of the object and generate the object mask.

In one or more embodiments, the step of generating one or more object masks may comprise a second method comprising: applying an object detection model that, for an object, detects the object and outputs a bounding box that encloses the detected object; and using the bounding box to form the object mask. In one or more embodiments, the second method may further comprise: using foreground segmentation on at least a portion of a video frame corresponding to the bounding box to identify one or more foreground portions; and forming the object mask by using at least part of the identified one or more foreground portions to refine the bounding box to reduce the object mask's area to more closely match the object.

In one or more embodiments, the step of generating one or more object masks may comprise a second method comprising: applying a detection and segmentation joint model to generate the object mask, wherein the detection and segmentation joint model has been pretrained using one or more training datasets.

In one or more embodiments, the step of generating one or more object masks may comprise performing one or more of the first, second, and third methods.

In one or more embodiments, the step of generating one or more object masks further comprises: applying one or more filters to detected objects to select a subset of one or more detected objects; and generating an object mask for each detected object in the subset of one or more detected objects. In one or more embodiments, the one or more filters comprise one or more of: one or more positional filters to exclude one or more objects detected in certain areas in a video frame; one or more size filters to exclude one or more objects beyond a certain size; one or more text recognition filters to exclude certain text-related objects; and one or more template matching filters to exclude objects of a particular configuration.

In one or more embodiments, a final modified version of the input video comprising the modified video sequences may be output, wherein the video sequences are combined into the final modified version of the video.

Some features and advantages of embodiments of the present invention have been generally described in this summary section; however, additional features, advantages, and embodiments are presented herein or will be apparent to one of ordinary skill in the art in view of the figures, specification, and claims hereof. Accordingly, it should be understood that the scope of the present invention shall not be limited by the particular embodiments disclosed in this summary section.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts a system for end-to-end system for video inpainting, according to embodiments of the present disclosure.

FIG. 6 depicts a filtering methodology, according to embodiments of the present disclosure.

FIG. 8 depicts an original image 805 from an input video and a corresponding inpainted output image 810, according to embodiments of the present disclosure.

DETAILED DESCRIPTION OF EMBODIMENTS

Figure 1:
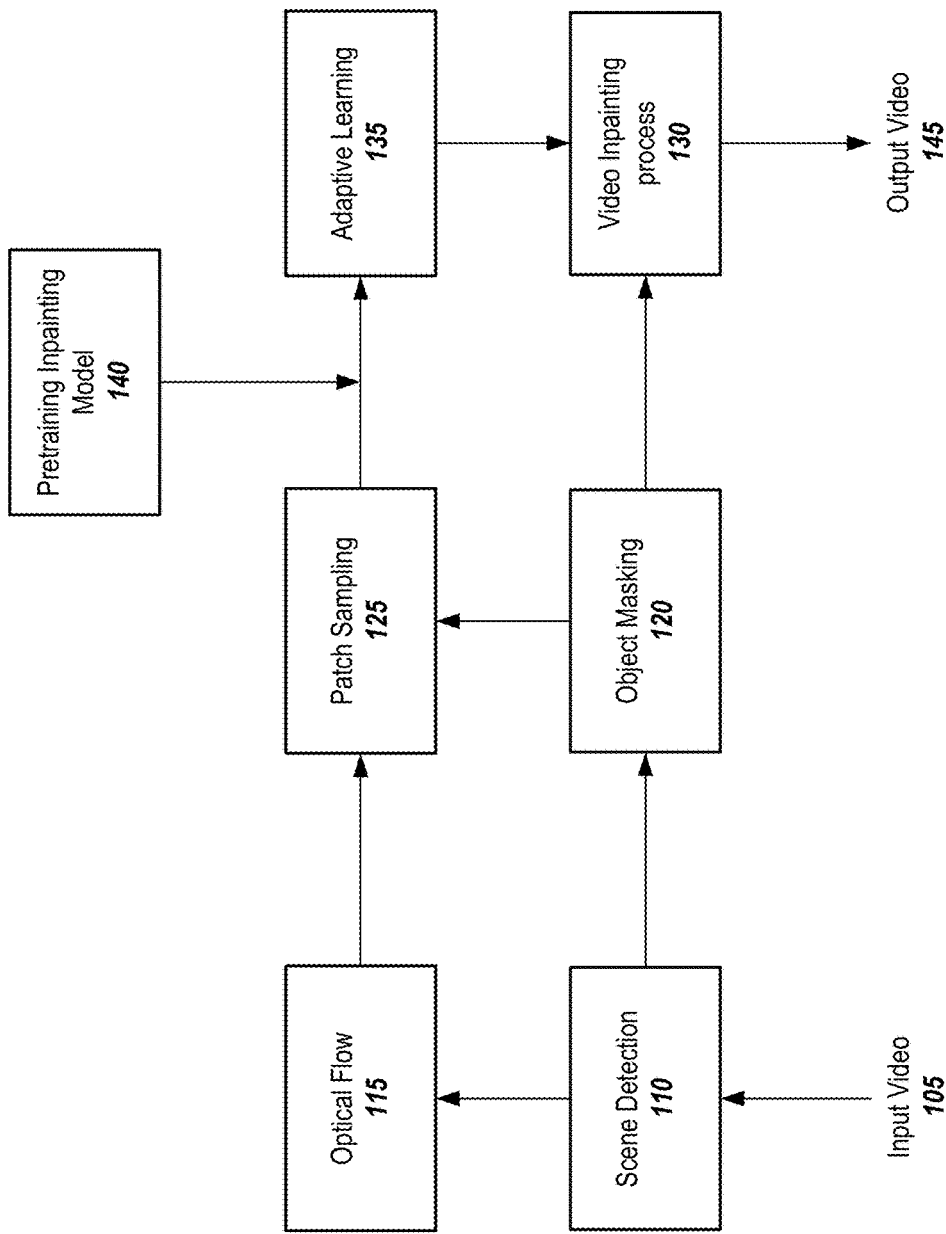

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of removing logos, text, etc. from videos, aspects of the present disclosure are not so limited. Accordingly, the aspects of the present disclosure may be applied or adapted for use in other contexts.

A. General Introduction

As noted above, flow-guided video painting methods may work well for removal of foreground objects when they are in motion in relation to backgrounds, but as they propagate from known regions based on optical flow, they may relocate unwanted patches that cause undesirable visual artifacts when optical flow estimation is not reliable. For objects like logo and text, this is more of a concern as they are relatively stationary and positioned near borders or edges where motions are not as significant as the central area. For areas that cannot be restored with propagation, generative adversarial network (GAN) based image painting methods have been tried to synthesize the missing content with high spatial coherence. However, these imaging inpainting models are typically trained with still images and do not take either known contents of the video nor temporal coherence into consideration.

To address these practical concerns, presented herein are embodiments of an end-to-end solution of object removal (e.g., logo, text, or both) using temporal adaptive learning. Embodiments may be built on top of a pretrained image inpainting model, and in-scene training data may be selected using optical-flow guided sampling to update the inpainting model. In one or more embodiments, sampled patches are used to update training of the image inpainting model until reaching a stop condition.

Embodiments present a number of novel contributions, including but not limited to the following. First, embodiments present end-to-end solutions to remove objects like logo and text in a video sequence and refill those objects with contents that are spatially and temporally coherent. Second, in-scene training patch sampling may be guided by optical flow of the video sequence. Third, embodiments employ adaptive learning using in-scene training samples with configurable convergence tolerance.

B. Systems and Methods Embodiments

1. General Overview

FIG. 1 depicts a system for end-to-end system for video inpainting, according to embodiments of the present disclosure. In one or more embodiments, the system comprises a scene detection module 110, an optical flow module 115, an object mask module 120, a patch sampling module 125, an inpainting model 140, and an adaptive learning module 135. In one or more embodiments, the system also includes a block 130 that represents the process of applying the inpainting model 140—after adaptive learning—to image frames of the video.

As illustrated in FIG. 1, the system receives an input image 105, which is processed through the system 100 to receive an output video 145 in which one or more portions of the video have been inpainted to remove a desired element or elements.

Each of the components or processes of FIG. 1 will be explained in more detail, below.

Figure 2:
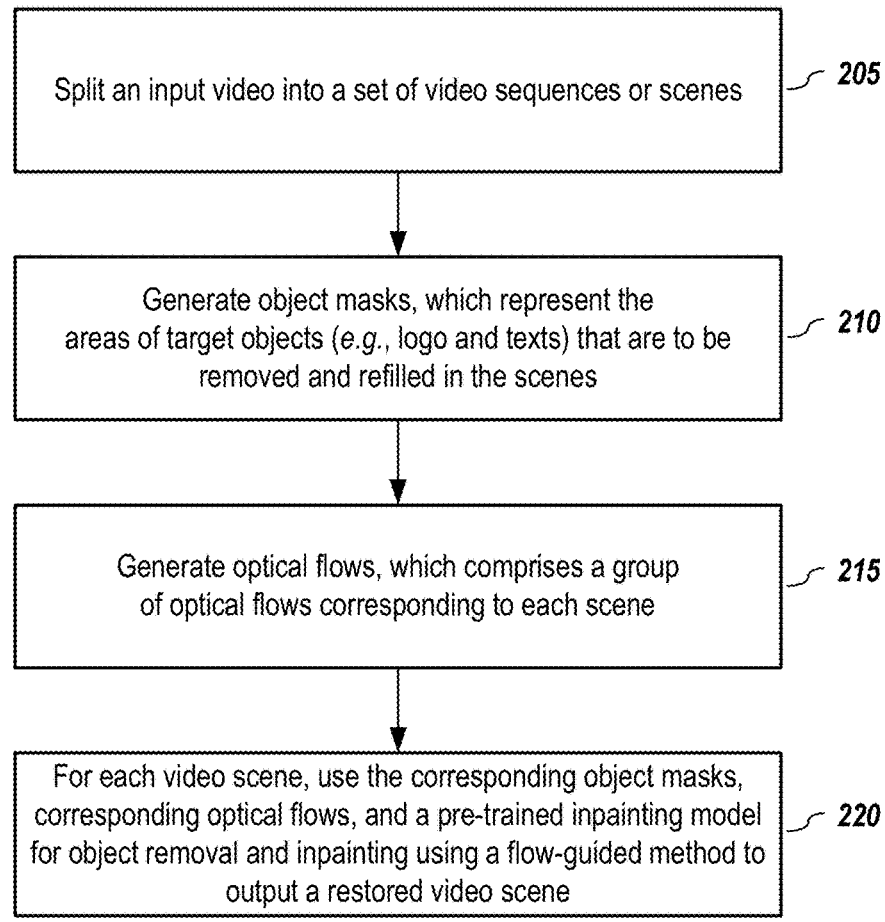
FIG. 2 depicts an end-to-end overview process for video inpainting for a video, according to embodiments of the present disclosure.

In relation to FIG. 1, FIG. 2 depicts an end-to-end overview process for video inpainting, according to embodiments of the present disclosure. It shall be noted that the methodology of FIG. 2 may be repeated for all the video scenes or sequences of an input video.

In one or more embodiments, a first step is to split (205) the input video V 105 into separate scenes (which may also be referred to as sequences, clips, or snippets) $V_i$ where i belongs to the range of scenes as determined by a scene detection process or module 110. In one or more embodiments, scene detection may be performed by any existing scene detection systems or methodologies. An example of a module or tool that may be employed is PySceneDetect, which is an open-source application and Python library for detecting scene changes in videos and for automatically splitting the video into separate sequences. It shall be noted that other scene detection systems or methods may also be employed.

In one or more embodiments, another step is generating (210), for each scene, one or more object masks that represent the area or areas of target objects—such as logo and texts—that are to be removed and refilled. For mask M of the overall video, it may comprise a series of masks $M_i$ corresponding to the scenes $V_i$, and each object mask $M_i$ for scene $V_i$ may comprise a group of one or more masks $M_i^{o_j}$, in which the scene $V_i$ comprises one or more objects o that may be targeted for being masked. As will be explained in more detail below, the object masking module may employ one or more modules or methods for detecting and segmenting target objects in a video scene to form a mask or masks.

In one or more embodiments, another process involves generating (215) optical flows F, which may comprise a group of Fr of optical flows that correspond to each scene.

Given the video sequences or scenes, for each video scene, the corresponding object masks, corresponding optical flows, and a pre-trained inpainting model may be used (220) for object removal and inpainting using a flow-guided adaptive learning methodology in order to output a restored video scene. For example, in one or more embodiments, given these inputs, embodiments use sample portions from the video using the patch sampling module 125 to adaptively update or train 135 an inpainting model 140, which may be pretrained. As shown in FIG. 1, the final output is a video 145 with inpainting to remove the desired object(s).

Methodology 1 depicts an example overview methodology for object removal and inpainting with flow-guided adaptive learning, according to embodiments of the present disclosure. It shall be noted that the process may be repeated for all the scenes of an input video.

Input: Original video scene $V_i$, object mask $M_i$, optical flow $F_i$, pretrained inpainting model I(•)
    for each $o_j$, $j \in [1, O_i]$ do (where $O_i$ = the count of objects in scene $V_i$)
        while I(•) not converged for mask $M_i^{O_j}$ do
            Based upon $F_i$, sample a set of patches P outside of $M_i^{O_j}$
            Generate corresponding set of masked patches $\overline{P}$
            Train I(•) using $\overline{P}$ as input and P as reference (i.e., ground truth)
            Apply updated inpainting model I(•) to inpaint region
            Check $I(V_i, M_i^{O_j})$ to see if it has converged
        end
        Modify video $V_i = I(V_i, M_i^{O_j})$
    end
    Output: Output video, $\hat{V}_i$ with inpainting for removed object(s)

Figure 3:
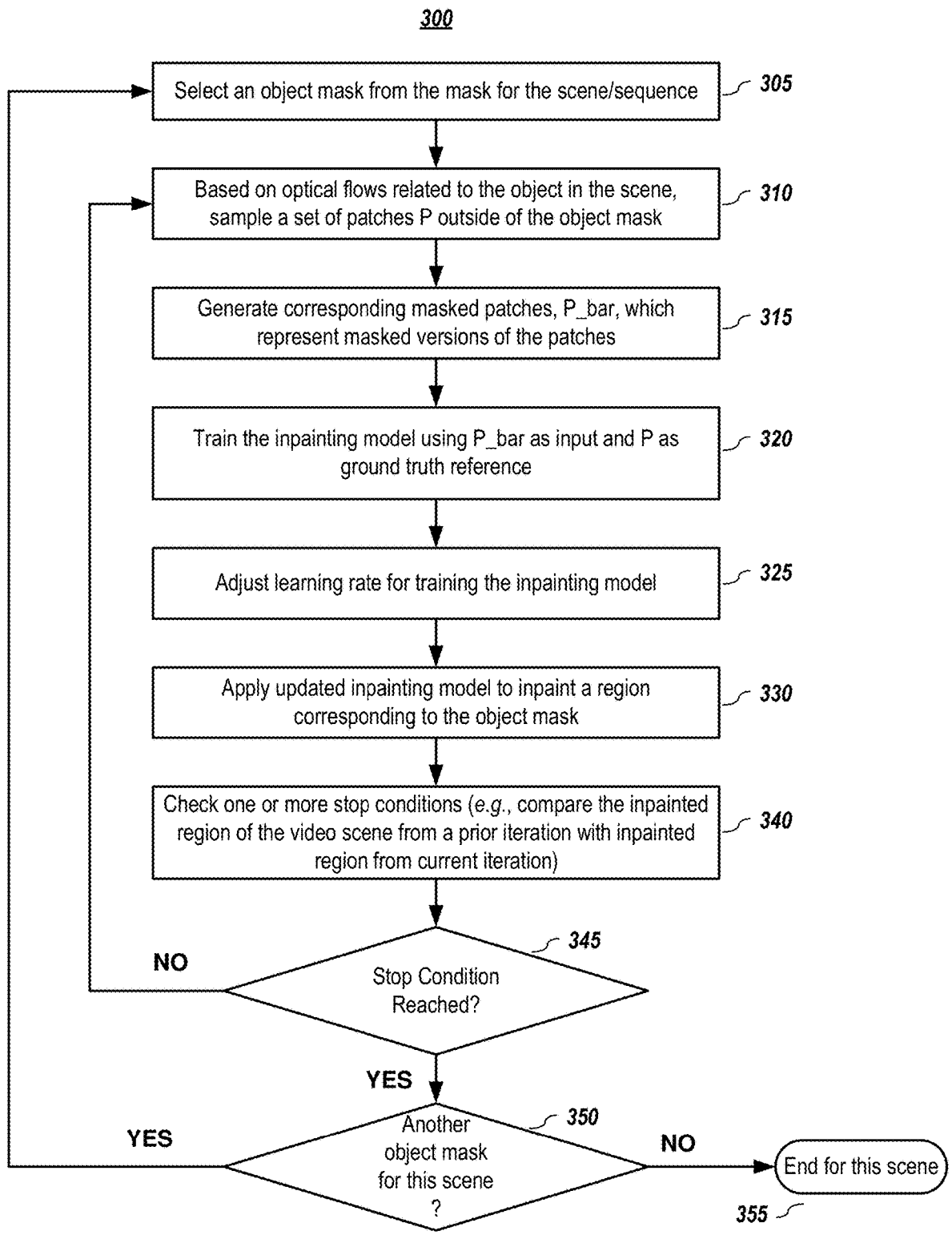
FIG. 3 depicts an alternative methodology for object removal and inpainting with flow-guided adaptive learning for a video scene, according to embodiments of the present disclosure.

FIG. 3 depicts an alternative methodology for object removal and inpainting with flow-guided adaptive learning for one video scene, according to embodiments of the present disclosure.

For the methodology depicted in FIG. 3, it is given that an original video has been divided in scenes/sequences, and that, for each scene, there is a mask with one or more object masks and corresponding optical flows. In one or more embodiments, an object mask is selected (305) from the mask for a given scene/sequence. The optical flows related to the object may be average velocity functions in the x and y directions around the object mask area, although other optical flow measures may be used.

In one or more embodiments, based on optical flows related to the object in the scene, a set of patches P outside of the object mask is sampled (310), and corresponding masked patches, $\overline{P}$, which represent masked versions of the patches are generated (315). The set of patches, P, and the corresponding set of masked patched, $\overline{P}$, form a training set of data that may be used for supervised learning to update a pretrained inpainting model I(.).

In one or more embodiments, the inpainting model may be adaptively trained (320) using masked patches ($\overline{P}$) as inputs and the corresponding patches (P) as ground truth references. In one or more embodiments, a learning rate for training the inpainting model may be adjusted (325), and the inpainting model may be updated (330) to inpaint a region corresponding to the object mask.

In one or more embodiments, one or more stop conditions may be checked (340) to determine if a stop condition has been met. The stop conditions may include: (1) a set number of iterations have been performed; (2) an amount of processing time has been reached; (3) convergence (e.g., the difference between the inpainted region of the video scene from the prior iteration compared with the corresponding inpainted region from the current iteration is less than a threshold—see, e.g., Equation (5), below); (4) divergence (e.g., the performance deteriorates); and (5) an acceptable outcome has been reached.

Responsive to a stop condition not having been met, the process may return (345) to step 310, in which the inpainting model I(.) is further refined.

Responsive to a stop condition having been met, the process may then check if the mask has another object mask for this scene. If there is another object mask, the process may be repeated by returning to step 305 by selecting the next object mask. If there is not another object mask for this scene, the process ends for this scene (355). It shall be noted that the methodology may be repeated for another scene from the input video and may continue until all scenes for the input video have been processed. Once all scenes are processed, they may be combined and a final inpainted video may be output.

Figure 4:
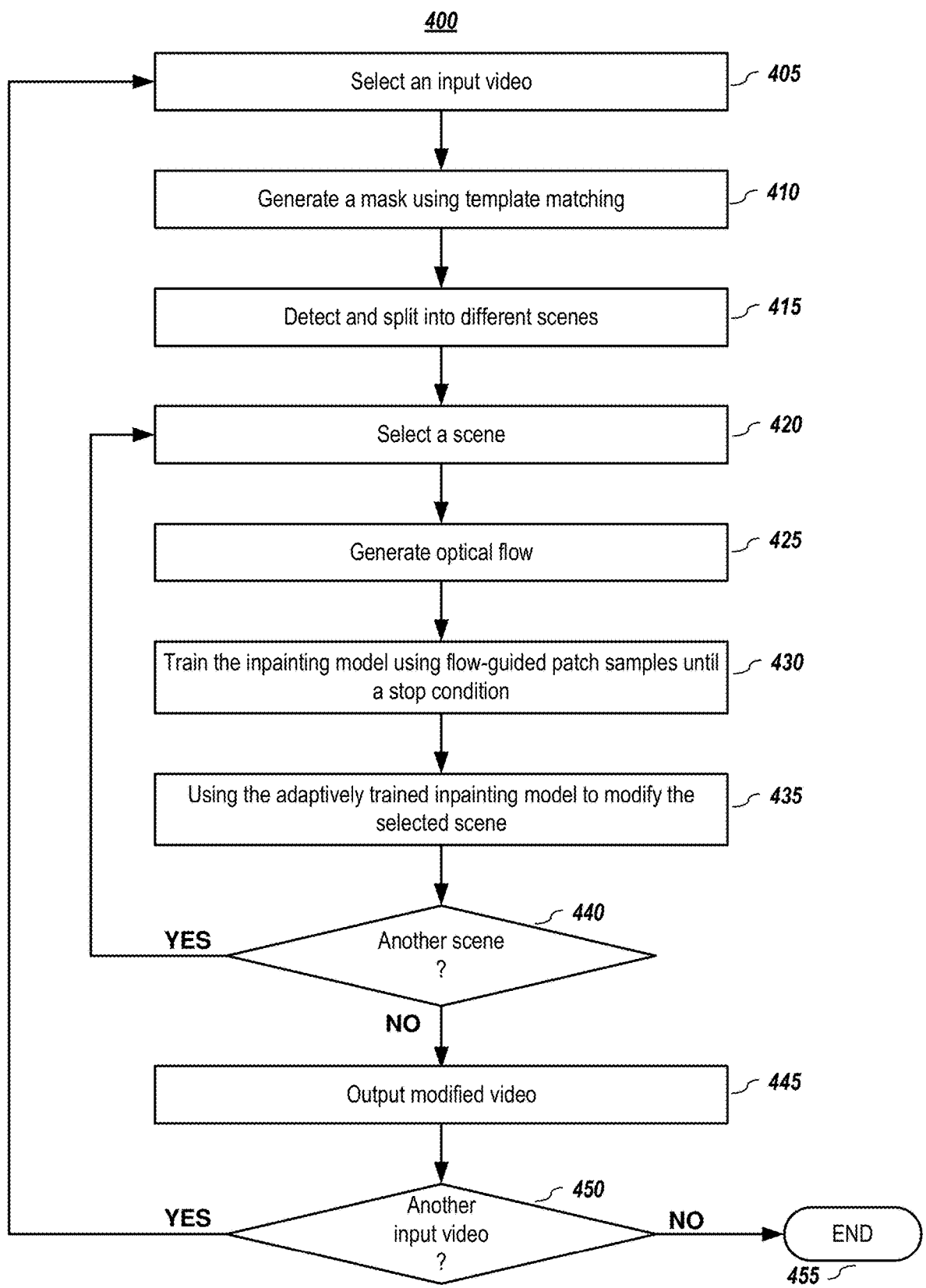
FIG. 4 depicts yet another alternative methodology for object removal and inpainting with flow-guided adaptive learning using a template, according to embodiments of the present disclosure.

FIG. 4 depicts yet another alternative methodology for object removal and inpainting with flow-guided adaptive learning using a template, according to embodiments of the present disclosure. In one or more embodiments, if more than one input video is desired for processing, then an input video is selected (405). The methodology for FIG. 4 involves using a template of the object or objects to be removed. For example, if the object to be removed is a known logo, then the logo may be used to generate (410) a template. As explained in more detail in the next section, in one or more embodiments, given a known template of an object or objects (e.g., a template of a logo, text, an item, etc.), a template matching function is applied at different scale versions of the template relative to video frames of a scene to generate the mask or masks for the scene.

If not already done, in one or more embodiments, the video scenes are detected to split the selected video into different scenes. A scene may then be selected (420) for object removal and inpainting according to the following steps.

In one or more embodiments, optical flow $F_i$ is generated (425) for the selected scene. Using flow-guided patch samples, an inpainting model I(.), which may be pretrained, is trained (430) until a stop condition is achieved. Embodiments of how the flow-guided patches are sampled are discussed in more detail below. In one or more embodiments, the adaptively trained inpainting model is used (435) to modify the selected scene, i.e., $V_i = I(V_i, M)$, where $V_i$ is the scene and M represents the mask.

The process may be repeated (440) for another scene. Once all scenes are processed, they may be combined and a final inpainted video may be output (445).

Note also, that if more than one video is to be processed, the method may be repeated (450) for another input video. Otherwise, the process may terminate (455).

2. Object Masking Embodiments

Figure 5:
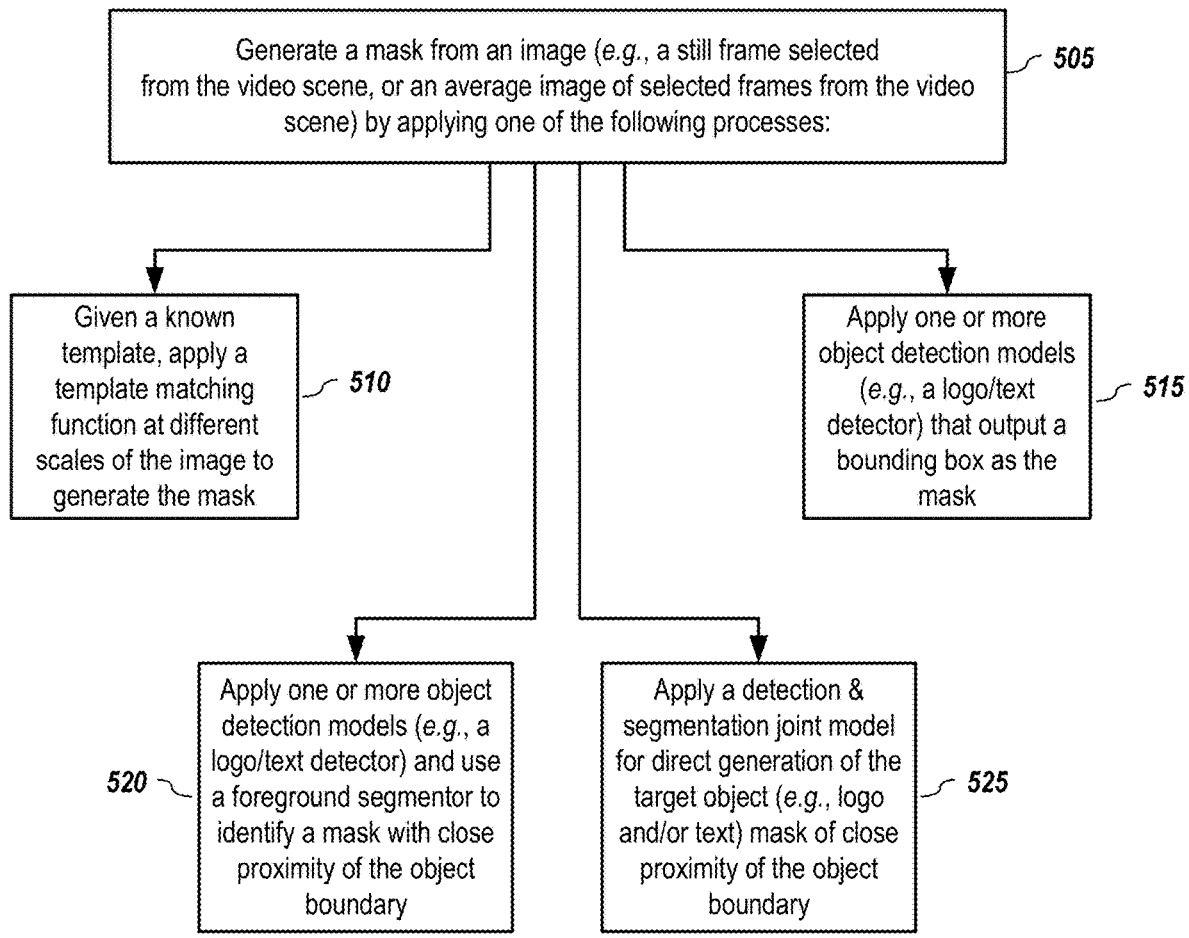
FIG. 5 depicts various methods that may be employed to generate object marks, according to embodiments of the present disclosure.

As noted above, a part of the process is generating object masks. In one or more embodiments, an object mask $M_i^{O_j}$ may be generated in one or more ways. FIG. 5 depicts various methods that may be employed to generate object masks, according to embodiments of the present disclosure.

As a preliminary matter, a mask may be generated from one or more images. For example, in one or more embodiments, a single video image may be used to represent a video scene (e.g., a still frame selected from the video scene may be used, or an average image of selected frames from the video scene may be used). Given a video image or images, a mask may be generated (505) by applying one of the following processes:

In one or more embodiments, given a known template of an object or objects (e.g., a template of a logo, text, an item, etc.), a template matching function is applied (510) at different scale versions of the template relative to a video image for a scene to generate the mask for the scene. For example, a template of the object may be scaled to different sizes and the differently scaled templates may be systematically compared (e.g., in a sliding fashion) across one or more video frames of a video scene to find the matching location and scale of the template for each frame.

In one or more embodiments, one or more object detection models (e.g., one or more models for one or more logos, texts, and/or items) are applied (515) to a video image. The output of the one or more models includes one or more bounding boxes of the detected object(s), which bounding box(es) may be used as the mask.

In one or more embodiments, the one or more object detection models of step 515 may be used, but additionally, a foreground segmentation process may be applied to at least the bounding box portion of the video frame to refine (520) the mask from the bounding box to the proximity of the object boundary. An example segmentation model is DeepLab, which is a semantic segmentation architecture that, once pre-trained/trained, assigns each pixel of an image to either foreground or background. It shall be noted that there are readily applicable existing models which do not require training; thus, the subsequent segmentation can be directly applied to areas within the bounding boxes. It shall also be noted that other segmentation models may be employed.

In one or more embodiments, a joint detection and segmentation model may be used (525) for direct generation of the mask of close proximity of the object boundary. For example, in one or more embodiments, a training dataset comprises pairs of images, in which one of the images of the pair of images corresponds to a binary mask of the other image, which may be the raw image, may be used to train such a model. In such cases, pixels with a "1" value associated with the pixel indicate presence of the target object, and pixels with a "0" value associated with the pixel are not the target object in the image. One benefit of using a joint model is that a detection and segmentation joint model can generate a target object mask effectively as one step. As noted above, an example segmentation model is DeepLab, which is a semantic segmentation architecture that associates or assigns each pixel of an image with either foreground or background.

Such training datasets may be obtained or may be generated. In one or more embodiments, a training dataset may be generated manually by painting over the target objects. Alternatively, or additionally, a mask image of a training pair may be generated automatically before being filtered by visual inspection. For example, in one or more embodiments, an automatic generation of masks may be obtained using template matching, detection with subsequent foreground segmentation, or using a pre-trained detection and segmentation joint model. Alternatively, or additionally, the mask image of a training pair may be generated automatically by overlaying a synthetic object (e.g., a logo, text, or other object) on an existing image such that the mask is mapped directly from the synthesized object.

It shall be noted that the object masking module 120 may implement one or more of the methods presented herein for generating a mask, including filtering, which is described in the next section.

3. Filtering Embodiments

In one or more embodiments, as part of the mask generation of the prior section or as a subsequent process, one or more filters may be applied. Thus, a list of detected objects may be further filtered to select a subset detected objects when generating object masks for removal and refilling/inpainting.

FIG. 6 depicts a filtering methodology, according to embodiments of the present disclosure. In one or more embodiments, given a list of detected objects for a mask, one or more filters are applied (605) to filter the list of detected objects to select a subset to generate object masks for further removal and refilling/inpainting. The filters may comprise one or more of the following (which are provided by way of example and not limitation): one or more positional filters to exclude one or more objects detected in certain areas in a video frame; one or more size filters to exclude one or more objects of a certain size (e.g., exclude objects above a certain size limit); one or more text recognition filters to exclude certain text-related objects; and one or more template matching filters to exclude certain objects. Once filtered, the final mask may be output (610) for use in object removal and refilling/inpainting.

4. Flow-Guided Patch Sampling Embodiments

An important part of embodiments of the adaptive learning to refine the inpainting model I(.) is to refill the removed object area with spatially and temporally coherent content. In one or more embodiments, selecting patches may involve a number of considerations. First, the sampled patches are preferably outside the object mask area. Second, a sampled patch in one video frame are preferably located at (or at least partially include) the object mask area in another video frame, if possible. In one or more embodiments, one methodology to improve accuracy is to use template matching to find the best matches, and optical flow may be used as a guide to reduce search areas. However, such embodiments may be time consuming and may also have issues when the motion in the scene is too complex or too little. Accordingly, presented below are embodiments of approximate and effective sampling methods that have near-optimal results and are more fault-tolerant when optical flow is not reliable. It shall be noted that the patch sampling module 125 may implement one or more of the methods presented herein.

Figure 7:
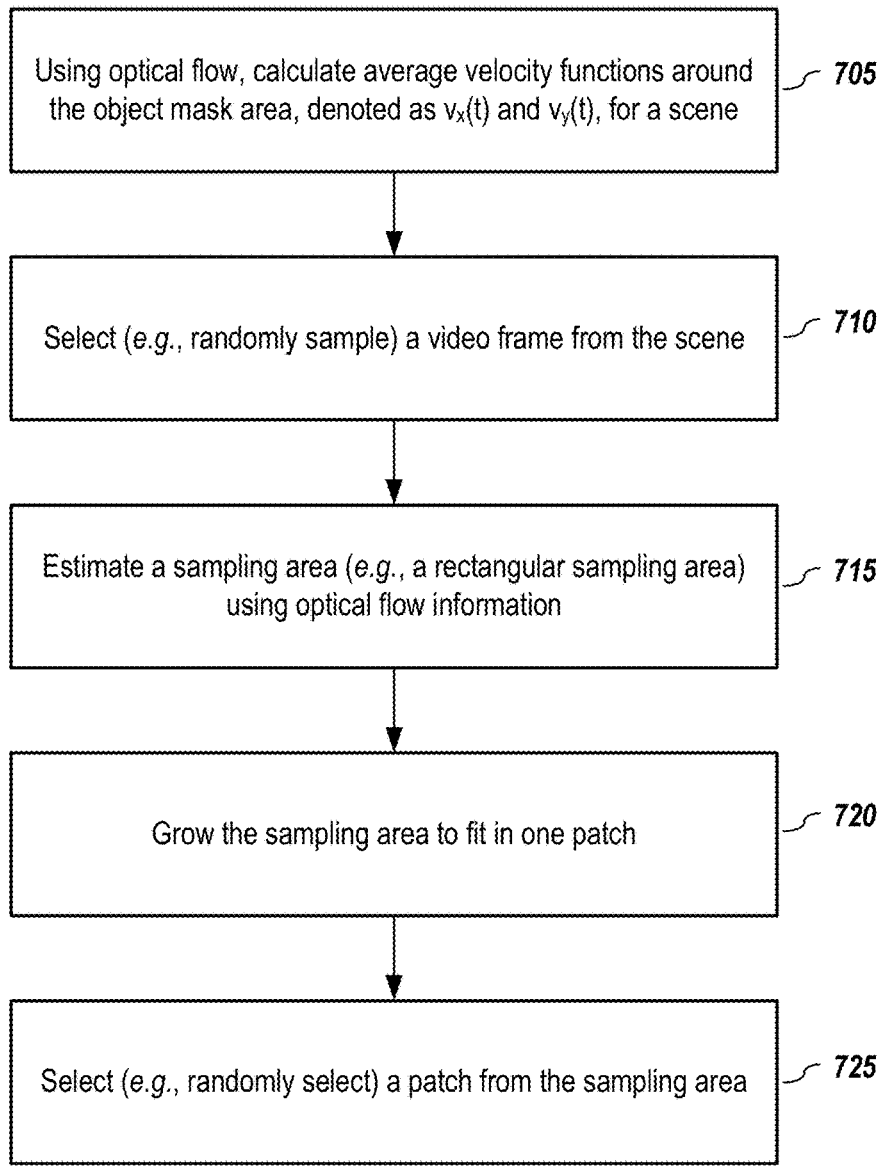
FIG. 7 depicts a methodology for sampling one training patch, according to embodiments of the present disclosure.

FIG. 7 depicts a methodology for sampling one training patch, according to embodiments of the present disclosure. In one or more embodiments, based on the optical flow F, average velocity functions around the mask area, denoted as $v_x(t)$ (0 and $v_y(t)$, are calculated (705) for the duration of $t \in (t_1, t_N)$ for scene i, where $t_1$ is the timestamp for the start of scene i, $t_N$ is the timestamp for the end of scene i. In one or more embodiments, FlowNet, a variant thereof, or another optical flow estimator may be used to generate the optical flow information. A video frame j in scene i is selected (710), where $t_j$ is the time stamp for frame j in scene i. In one or more embodiments, the video frame j may be randomly selected.

In one or more embodiments, a sampling area in the video frame is determined (715). In one or more embodiments, the sampling area is a rectangular area defined by the coordinates $(x_1, x_2, y_1, y_2)$, which may be determined using the following equations:

$$x_1 = \min\left(\min_{\forall k \in (1,j)} \int_t^{t_j} v_x(t)dt, \min_{\forall k \in (j,N)} \int_{t_j}^t -v_x(t)dt\right) \quad (1)$$

$$x_2 = \max\left(\max_{\forall k \in (1,j)} \int_t^{t_j} v_x(t)dt, \min_{\forall k \in (j,N)} \int_{t_j}^t -v_x(t)dt\right) \quad (2)$$

$$y_1 = \min\left(\min_{\forall k \in (1,j)} \int_t^{t_j} v_y(t)dt, \min_{\forall k \in (j,N)} \int_{t_j}^t -v_y(t)dt\right) \quad (3)$$

-continued $$y_2 = \max\left(\max_{\forall k \in (1,j)} \int_t^{t_j} v_y(t)dt, \min_{\forall k \in (j,N)} \int_{t_j}^t -v_y(t)dt\right) \quad (4)$$

In one or more embodiments, given the size of the sampling area defined by the coordinates, if it is less than the object mask patch, the sampling area may be grown (720) to fit in the object patch. For example, the sampling area may be grown equally from the center and shifted away, if the grown sampling area overlaps with the mask area. One skilled in the art shall recognize a number of ways to grow the sample—including, without limitation, growing in certain directions, in a certain way, and/or measured from certain features.

Given the sampling area, a patch may be selected (e.g., may be randomly selected) from the sampling area. In one or more embodiments, one or more patches may be selected from the sampling area. Additionally, or alternatively, in one or more embodiments, one or more patches may be sampled at a time and the process may loop between steps 710 and 725 until a set of patches is obtained.

After having obtained a set of patches, the set of patches may be used for adaptive learning for the inpainting model.

5. Adaptive Learning Embodiments

In one or more embodiments, the inpainting model I(.) may be any learning-based image inpainting model. For example, an inpainting model such as described by Rui Xu et al. in "Deep Flow-guided video inpainting," in *Proceedings of the IEEE Conference on Computer Vision and Pattern Recognition*, pp. 3723-3732 (2019) may be used—although other inpainting models may be employed.

In one or more embodiments, the inpainting model is pretrained with a large dataset. In one or more embodiments, to further train the inpainting model, I(.), to be adapted to a certain video sequence V, a set of training patch pairs sampled within V and masked accordingly (e.g., using masked patches (P) and their the corresponding patches (P) as ground truth references) as described herein. As shown in the embodiments above, I(.) may be trained with multiple iterations until converge. It shall be noted that the adaptive learning module 135 may implement one or more of the methods presented herein.

In one or more embodiments, the convergence criterion may be based on the loss function of these sampled patch pairs. In one or more embodiments, the restoration quality at the refilled object mask area is the ultimate goal, but there is no reference to calculate the loss function. Alternatively, the following practical metric may be calculated to assess the convergence of adaptive training, where $I_l(.)$ is the newly trained inpainting model after iteration l. When $E_l$ is below a predetermined convergence tolerance $\epsilon$, the training may be stopped. It shall be noted that, in one or more embodiments, $\epsilon$ may be adjusted to achieve different processing speeds.

$$E_l = \|I_l(V,M) - I_{l-1}(V,M)\| \quad (5)$$

In one or more embodiments, a final modified version of the input video comprising the modified video sequences may be output, wherein the video sequences are combined into the final modified version of the video. It shall be noted that the video inpainting process module 130 may use the adaptively trained inpainting model to modify the video scenes and form the final output video.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

FIG. 8 depicts an original image 805 from an input video and a corresponding inpainted output image 810, according to embodiments of the present disclosure. The example 810 shows how embodiments help improve video quality by finding and removing unwanted objects in the video. As the source video snippets have different logo size, shape, style and/or quality, they need to be removed and refilled. Also, once refilled, the video may be stamped with a new logo throughout the final video.

As shown in FIG. 8, the logo is removed and refilled with natural looking contents. The results of refilling using pretrained I(.) without flow-guided adaptive learning, by comparison, show more obvious artifacts comparing to the one with adaptive learning.

D. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 9:
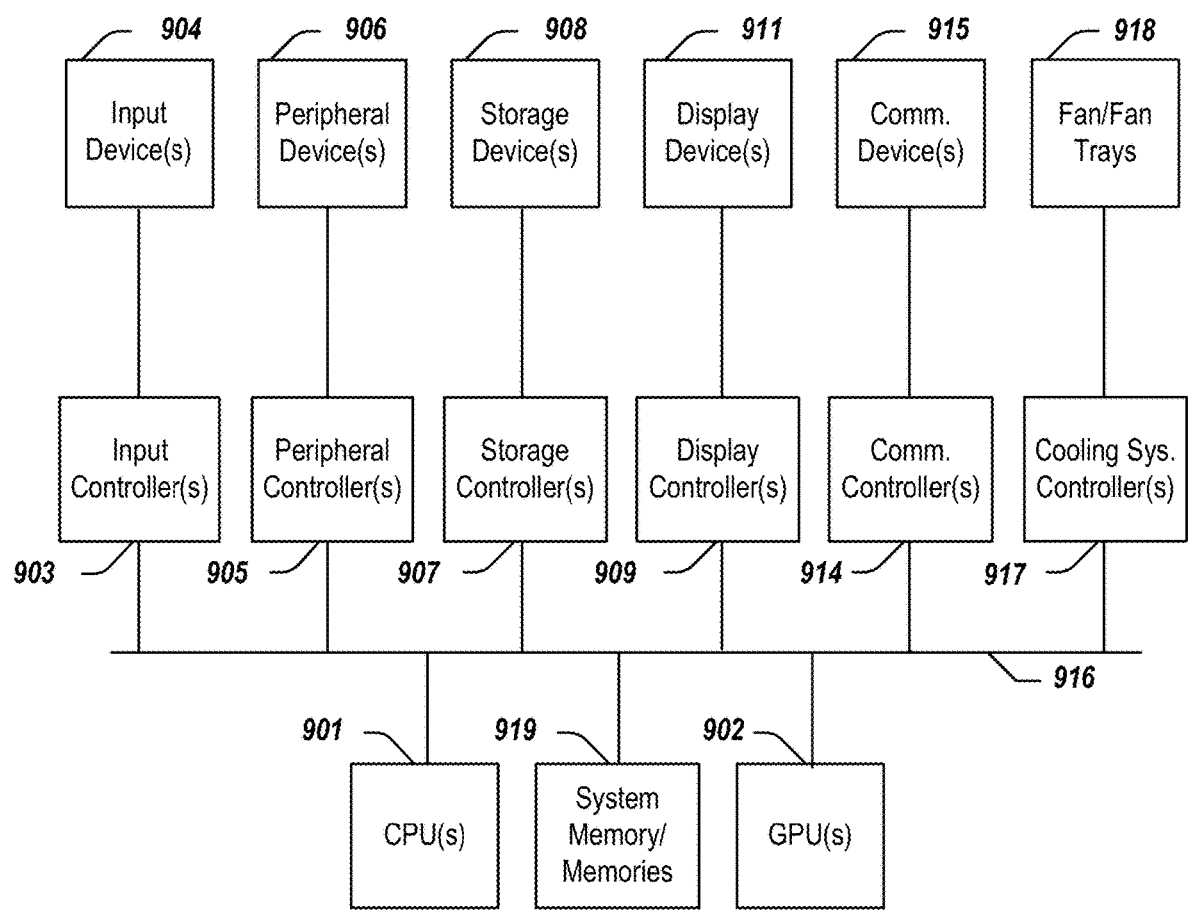
FIG. 9 depicts a simplified block diagram of a computing device/information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
splitting an input video into a set of video sequences, which comprise one or more video frames;
generating one or more object masks, which represent one or more areas comprising an object or objects targeted to be removed and inpainted in the video sequences;
generating optical flows for each video sequence; and
for each video sequence from the set of video sequences:
adaptively training an inpainting model, which has been pretrained, using, as inputs into the inpainting model independent from being input, if at all, into a loss function, masked patch samples, in which patch samples were selected from the video sequence using at least some of the optical flows to obtain an updated inpainting model; and using the updated inpainting model to modify the video sequence to inpaint at least part of the video sequence.

2. The computer-implemented method of claim 1 wherein the step of adaptively training an inpainting model using, as inputs into the inpainting model independent from being input, if at all, into a loss function, masked patch samples, in which patch samples were selected from the video sequence using at least some of the optical flows to obtain an updated inpainting model comprises:

using optical flows related to a detected object or objects in the video sequence to define one or more sampling areas in the video sequence;

sampling one or more patches in the one or more sampling areas;

for each patch, generating a corresponding masked patch, which represent a masked version of the patch; and updating the inpainting model using the masked patches as inputs into the inpainting model and the patches as corresponding ground truth references.

3. The computer-implemented method of claim 2 wherein the step of using optical flows related to a detected object or objects in the video sequence to define one or more sampling areas in the video sequence comprises:

for an object mask of the video sequence:

calculating average velocity functions around the object mask using optical flows from the sequence;

selecting a video frame from the sequence; and estimating the sampling area in a video frame of the video sequence using the average velocity functions.

4. The computer-implemented method of claim 1 wherein the step of generating one or more object masks comprises performing one or more of methods comprising:

method A:
given a known template corresponding to the object to be located, applying template matching at different image scales to detect a location and scale of the object and generate the object mask;

method B:
applying an object detection model that, for an object, detects the object and outputs a bounding box that encloses the detected object; and
using the bounding box to form the object mask; and method C:
applying a detection and segmentation joint model to generate the object mask, wherein the detection and segmentation joint model has been pretrained using one or more training datasets.

5. The computer-implemented method of claim 4 wherein the steps of method B further comprise:

using foreground segmentation on at least a portion of a video frame corresponding to the bounding box to identify one or more foreground portions; and forming the object mask by using at least part of the identified one or more foreground portions to refine the bounding box to reduce the object mask's area to more closely match the object.

6. The computer-implemented method of claim 1 wherein the step of generating one or more object masks further comprises:

applying one or more filters to detected objects to select a subset of one or more detected objects; and generating an object mask for each detected object in the subset of one or more detected objects.

7. The computer-implemented method of claim 6 wherein the one or more filters comprise one or more of:

one or more positional filters to exclude one or more objects detected in certain areas in a video frame;

one or more size filters to exclude one or more objects of a certain size;

one or more text recognition filters to exclude certain text-related objects; and one or more template matching filters to exclude objects of a particular configuration.

8. The computer-implemented method of claim 1 further comprising:

outputting a final modified version of the input video comprising the modified video sequences.

9. A system comprising:

one or more processors; and a non-transitory computer-readable medium or media comprising one or more sets of instructions which, when executed by at least one of the one or more processors, causes steps to be performed comprising:

splitting an input video into a set of video sequences, which comprise one or more video frames;

generating one or more object masks, which represent one or more areas comprising an object or objects targeted to be removed and inpainted in the video sequences;

generating optical flows for each video sequence; and for each video sequence from the set of video sequences:

adaptively training an inpainting model, which has been pretrained, using, as inputs into the inpainting model independent from being input, if at all, into a loss function, masked patch samples, in which patch samples were selected from the video sequence using at least some of the optical flows to obtain an updated inpainting model; and using the updated inpainting model to modify the video sequence to inpaint at least part of the video sequence.

10. The system of claim 9 wherein the step of adaptively training an inpainting model using, as inputs into the inpainting model independent from being input, if at all, into a loss function, masked patch samples, in which patch samples were selected from the video sequence using at least some of the optical flows to obtain an updated inpainting model comprises:

using optical flows related to a detected object or objects in the video sequence to define one or more sampling areas in the video sequence;

sampling one or more patches in the one or more sampling areas;

for each patch, generating a corresponding masked patch, which represent a masked version of the patch; and updating the inpainting model using the masked patches as inputs into the inpainting model and the patches as corresponding ground truth references.

11. The system of claim 10 wherein the step of using optical flows related to a detected object or objects in the video sequence to define one or more sampling areas in the video sequence comprises:

for an object mask of the video sequence:

calculating average velocity functions around the object mask using optical flows from the sequence;

selecting a video frame from the sequence; and estimating the sampling area in a video frame of the video sequence using the average velocity functions.

12. The system of claim 9 wherein the step of generating one or more object masks comprises performing one or more of methods comprising:
method A:
given a known template corresponding to the object to be located, applying template matching at different image scales to detect a location and scale of the object and generate the object mask;
method B:
applying an object detection model that, for an object, detects the object and outputs a bounding box that encloses the detected object; and
using the bounding box to form the object mask; and
method C:
applying a detection and segmentation joint model to generate the object mask, wherein the detection and segmentation joint model has been pretrained using one or more training datasets.

13. The system of claim 12 wherein the steps of method B further comprise:
using foreground segmentation on at least a portion of a video frame corresponding to the bounding box to identify one or more foreground portions; and
forming the object mask by using at least part of the identified one or more foreground portions to refine the bounding box to reduce the object mask's area to more closely match the object.

14. The system of claim 9 wherein the step of generating one or more object masks further comprises:
applying one or more filters to detected objects to select a subset of one or more detected objects; and
generating an object mask for each detected object in the subset of one or more detected objects.

15. The system of claim 14 wherein the one or more filters comprise one or more of:
one or more positional filters to exclude one or more objects detected in certain areas in a video frame;
one or more size filters to exclude one or more objects of a certain size;
one or more text recognition filters to exclude certain text-related objects; and
one or more template matching filters to exclude objects of a particular configuration.

16. The system of claim 9 wherein the non-transitory computer-readable medium or media further comprising one or more sequences of instructions which, when executed by at least one processor, causes steps to be performed comprising:
outputting a final modified version of the input video comprising the modified video sequences.

17. A non-transitory computer-readable medium or media comprising one or more sequences of instructions which, when executed by at least one processor, causes steps comprising:
splitting an input video into a set of video sequences, which comprise one or more video frames;
generating one or more object masks, which represent one or more areas comprising an object or objects targeted to be removed and inpainted in the video sequences;
generating optical flows for each video sequence;
for each video sequence from the set of video sequences:
adaptively training an inpainting model, which has been pretrained, using, as inputs into the inpainting model independent from being input, if at all, into a loss function, masked patch samples, in which patch samples were selected from the video sequence using at least some of the optical flows to obtain an updated inpainting model; and
using the updated inpainting model to modify the video sequence to inpaint at least part of the video sequence; and
outputting a final modified version of the input video comprising the modified video sequences.

18. The non-transitory computer-readable medium or media of claim 17 wherein the step of adaptively training an inpainting model using, as inputs into the inpainting model independent from being input, if at all, into a loss function, masked patch samples, in which patch samples were selected from the video sequence using at least some of the optical flows to obtain an updated inpainting model comprises:
using optical flows related to a detected object or objects in the video sequence to define one or more sampling areas in the video sequence;
sampling one or more patches in the one or more sampling areas;
for each patch, generating a corresponding masked patch, which represent a masked version of the patch; and
adaptively training the inpainting model using the masked patches as inputs into the inpainting model and the patches as corresponding ground truth references.

19. The non-transitory computer-readable medium or media of claim 18 wherein the step of using optical flows related to a detected object or objects in the video sequence to define one or more sampling areas in the video sequence comprises:
for an object mask of the video sequence:
calculating average velocity functions around the object mask using optical flows from the sequence;
selecting a video frame from the sequence; and
estimating the sampling area in a video frame of the video sequence using the average velocity functions.

20. The non-transitory computer-readable medium or media of claim 17 wherein the step of generating one or more object masks further comprises:
applying one or more filters to detected objects to select a subset of one or more detected objects, wherein the one or more filters comprise one or more of:
one or more positional filters to exclude one or more objects detected in certain areas in a video frame;
one or more size filters to exclude one or more objects of a certain size;
one or more text recognition filters to exclude certain text-related objects; and
one or more template matching filters to exclude objects of a particular configuration; and
generating an object mask for each detected object in the subset of one or more detected objects.

* * * * *